United States Patent Office 2,863,892
Patented Dec. 9, 1958

2,863,892

SEPARATION OF PLUTONIUM FROM LANTHANUM BY CHELATION-EXTRACTION

Ralph A. James and Stanley G. Thompson, Richmond, Calif., assignors to the United States of America as represented by the United States Atomic Energy Commission No Drawing. Application May 5, 1947
Serial No. 746,160

21 Claims. (Cl. 260—429.1)

This invention relates to a process for the separation of plutonium from lanthanum and more especially relates to the separation of plutonium from lanthanum where the molal ratio of lanthanum-to-plutonium is considerably greater than unity.

Plutonium isotopes have been prepared by bombardment of uranium with slow or thermal neutrons. This bombardment may be carried out in an apparatus known as a neutronic reactor. One of the isotopes, namely $Pu^{239}$, is produced by the absorption of a neutron by $U^{238}$ to produce $U^{239}$ which, through beta-decay becomes $Np^{239}$ and finally $Pu^{239}$. In such production the amount of $Pu^{239}$ produced is less than 1% based on uranium content. In some cases the $Pu^{239}$ content is as low as one part in several million parts of uranium. Due to nuclear fission of $U^{235}$ present in the uranium used in the neutronic reactor, various radioactive fission fragments are produced in a total amount that is about equal to the amount of $Pu^{239}$ produced. Thus, when the uranium is converted to a water-soluble salt and an aqueous solution is prepared, the concentration of plutonium as a salt in the aqueous solution is quite low, it generally being so low that a carrier is required to obtain an efficient precipitation of the plutonium from the solution.

Several methods have been developed for the separation of $Pu^{239}$ from the radioactive fission fragments and from unconverted uranium. In one process the uranium is removed as uranyl nitrate by ether extraction, leaving plutonium as a tetravalent salt in the aqueous solution. The resultant aqueous solution is treated with an oxidizing agent to convert plutonium to the hexavalent state. The radioactive fission fragments as salts are removed from the aqueous solution by adding reagents which provide a cation and an anion which will precipitate upon being present in the same aqueous medium. The precipitate will carry with it a substantial percentage of the radioactive fission fragments and their decay products as salts; these precipitates are known as carriers. Upon separation of the precipitate from the aqueous solution the latter is treated with a reducing agent to convert plutonium to the tri- or tetravalent state. In either of these valence states it may be removed from the aqueous solution by the use of a carrier of the type described above for the separation of radioactive fission fragments. Two of the carriers that have been developed for removing plutonium as a salt from an aqueous solution are lanthanum phosphate and lanthanum fluoride. In view of the dilute aqueous solutions of plutonium salt usually encountered the molal ratio of lanthanum-to-plutonium in the carrier precipitate is substantially greater than unity; for example, greater than 5 to 1 and, in the usual case, this ratio is greater than 1000 to 1.

As a result of the use of lanthanum phosphate and lanthanum fluoride as carriers for the separation of a plutonium salt from an aqueous solution, the problem became one of developing a method for separating plutonium from its mixture with lanthanum.

It is an object of this invention to separate plutonium from lanthanum.

Another object of this invention is the separation of a plutonium salt from a lanthanum salt.

A further object of the present invention is the plutonium decontamination of lanthanum and radioactive fission products, so that the latter may be recycled to a carrier precipitate process effectuating an increased recovery of radioactive fission products.

Other objects and advantages of the present invention will become apparent from the description which follows.

We have found that plutonium can be separated from its mixture with lanthanum by preparing an aqueous solution of such a mixture having a pH between about 3 and 0.2. To this aqueous solution there is added an ammonium salt of a N-nitrosoarylhydroxylamine, i. e., a compound having the general formula

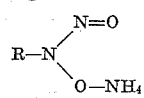

where R is an aryl radical, in an amount sufficient to form a chelate compound with plutonium, which separates from the aqueous solution.

As another embodiment of the present invention, rather than permitting the chelate compound to precipitate, the aqueous solution is contacted with an organic solvent and the chelate compound is extracted by the organic solvent. By extraction is meant not only solution of the chelate compound but also the wetting of it by the solvent and suspension therein.

As a third embodiment of this invention, an organic solvent solution of a N-nitrosoarylhydroxylamine, i. e., the free acid instead of the ammonium salt, is used to provide contact between the chelate-forming compound and the aqueous solution. After contact the phases are separated and the organic solvent will contain some plutonium chelate compound.

To form the chelate compound, plutonium must have the valence state of at least +3, i. e., plutonium may be present as trivalent, tetravalent or hexavalent plutonium. An example of a trivalent plutonium salt is plutonium trichloride. Examples of plutonium salts containing plutonium in a tetravalent state are triplutonium tetraphosphate and plutonium tetranitrate. An example of a plutonium salt in which plutonium is present in the hexavalent state is plutonium dioxydinitrate.

Although the trivalent and hexavalent plutonium form chelate compounds initially, they change over to the tetravalent chelate compound. It is the latter that is precipitated or extracted when N-nitrosoarylhydroxylamine or its ammonium salt is added to an aqueous solution containing trivalent or hexavalent plutonium. The following illustrates the probable formula for the tetravalent-plutonium chelate compound:

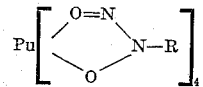

where R is an aryl radical.

The compound that forms a chelate compound with plutonium is the free acid or the ammonium salt of a N-nitrosoarylhydroxylamine. Examples of the salt are the ammonium salt of N-nitrosophenylhydroxylamine and the ammonium salt of N-nitroso-α-naphthylhydroxylamine. These two compounds are known commercially as cupferron and neo-cupferron.

Suitable organic solvents are those which are substantially water-immiscible and examples are chloroform, carbon tetrachloride, ethyl ether, ethyl acetate, benzene, and xylene. Of course, mixtures of organic solvents may be used. The ratio of volume of organic solvent to volume of aqueous solution may be varied widely, for example, from about 1 to 10 to about 10 to 1.

Since lanthanum will form a chelate compound when the pH of the aqueous solution is close to 7, the pH of the process of this invention is maintained considerably below 7, namely, in the range of 3 to 0.2. Where the mixture of lanthanum and plutonium is a lanthanum phosphate carrier precipitate and this precipitate is dissolved by the use of a concentrated inorganic acid, it is necessary to maintain an acidity of at least about 0.1 N in order to prevent lanthanum phosphate precipitation, i. e., the pH should be below about 0.5. In the case where the mixture of lanthanum and plutonium is obtained as a lanthanum fluoride precipitate and this precipitate is methathesized by the use of an alkali hydroxide with subsequent dissolution, using an inorganic acid, such as nitric acid, it is not necessary to maintain the pH below 0.5. In such a case the pH may be as high as 3, but is preferably between 1 and 0.2. If the pH is lower than about 0.2 the removal of plutonium as a chelate compound drops considerably. Therefore, the minimum pH limit is 0.2 in the process of the present invention.

The following experiment illustrates that plutonium may be separated from an aqueous solution containing a plutonium salt and a lanthanum salt in which the lanthanum-to-plutonium ratio is quite high. One-tenth ml. 10 N $HNO_3$ and 0.7 ml. 6 M $H_3PO_4$ were added to 5.1 ml. aqueous solution containing lanthanum and plutonium salts in amounts corresponding to 10 mg. lanthanum ion and 1100 alpha counts per minute of plutonium. Since the alpha count due to plutonium was measured with an instrument that has only 52% geometry, this amount of plutonium calculated to be 0.0155 microgram. Thus, the molal ratio of lanthanum-to-plutonium was about 1,100,000. After heating for one hour at 75° C. the precipitated lanthanum phosphate was separated by centrifuging, and the precipitate was washed twice with distilled water. Then the precipitate was dissolved in 0.3 ml. 10 N $HNO_3$ and 0.4 ml. of an aqueous 6.15 N NaOH solution was added, 0.1 ml. at a time, with vigorous stirring to dissolve $La(OH)_3$ as formed. Distilled water was then added in an amount of 4.375 ml. and 0.025 ml. more of the NaOH solution was added to provide a total volume of 5 ml. solution which was stirred and transferred to a separatory funnel. Three drops of a 6% aqueous solution of cupferron, i. e., 18 mg. of the theoretical 33.5 mg. needed to react with all of the lanthanum, and 5 ml. chloroform were added. The contents of the separatory funnel were shaken and upon separation of the chloroform layer it was drawn off. The chloroform layer was analyzed for plutonium content by evaporating the chloroform in a platinum dish and heating the residue with a 1 to 1 mixture of $HNO_3$ and $H_2SO_4$ until copious fumes of $SO_3$ were evolved. After cooling, three drops of hydrogen peroxide were added to decolorize the solution. After evaporation to almost dryness nitric acid was added and the solution was warmed. The alpha count of this solution indicated that 22% of plutonium had formed a chelate compound and had been extracted from the original aqueous solution. Analysis for alpha count of the aqueous solution after adding cupferron and contacting with chloroform showed this solution contained only about 7% of the original plutonium content. Thus, only 29% plutonium was accounted for. There was reason to believe that the unaccounted-for plutonium was in the chloroform layer, and that there was an error in the analysis of that layer. At any rate, at least 22% extraction was indicated and this was worth-while, considering the fact that the concentration of plutonium was about 3 micrograms per liter of solution while the amount of lanthanum in solution was 2 grams per liter. Also, the aqueous solution was not analyzed for percent of lanthanum extraction as a lanthanum chelate compound, but the work of others indicated that less than 1% lanthanum, as a chelate compound, was extracted by chloroform when 90 mg. N-nitrosophenylhdroxylamine was used as a chloroform solution and the aqueous solution containing 9.7 mg. lanthanum as a lanthanum salt and 2 N HCl was contacted therewith.

In carrying out this process plutonium may be recovered from its chelate compound in the organic solvent by contacting the organic solvent solution with a strong inorganic acid, i. e., an aqueous solution containing a pH of less than 0.1.

By removing plutonium from its mixture with lanthanum and radioactive fission products, the lanthanum and fission products mixture may be recycled to the ated with respect to plutonium by such carrier precipitate process, so that not only is lanthanum reused, but the net result is the more efficient recovery of desirable radioactive fission products which are decontaminated with respect to plutonium by which carrier precipitate processes. The radioactive fission products are desired for their use in medical work as radioactive materials and as tracers in biochemical and chemical studies in general. When the radioactive fission products are used as tracers in medical work, plutonium as an alpha-emitter should not be present as it is extremely harmful when received internally in the human body even in very small concentrations.

The scope of this invention is not to be limited by the illustration presented above, but is to be limited by the scope of the claims, which follow, and their equivalents.

What is claimed is:

1. A process for the separation of plutonium from a mixture of plutonium and lanthanum in which the lanthanum-to-plutonium molal ratio is at least 5, which comprises adding a compound from the group consisting of N-nitrosoarylhydroxylamines and ammonium salts of N-nitrosoarylhydroxylamines, to an aqueous solution having a pH between about 3 and 0.2 and containing in said molal ratio a lanthanum mineral acid salt and a plutonium mineral acid salt, said plutonium salt containing plutonium in a valence state of at least +3 and separating the resultant plutonium chelate compound of N-nitrosoarylhydroxylamine.

2. A process for the separation of plutonium from a mixture of plutonium and lanthanum in which the lanthanum-to-plutonium molal ratio is at least 5, which comprises adding an ammonium salt of a N-nitrosoarylhydroxylamine to an aqueous solution having a pH between about 3 and 0.2 and containing in said molal ratio a lanthanum mineral acid salt and a plutonium mineral acid salt, said plutonium salt containing plutonium in a valence state of at least +3, and removing the precipitated plutonium chelate compound of N-nitrosoarylhydroxylamine.

3. A process for the separation of plutonium from a mixture of plutonium and lanthanum in which the lanthanum-to-plutonium molal ratio is at least 5, which comprises adding a compound selected from the group consisting of N-nitrosoarylhydraxylamines and ammonium salts of N-nitrosoarylhydroxylamines to an aqueous solution having a pH between about 3 and 0.2 and containing in said molal ratio a lanthanum mineral acid salt and a plutonium mineral acid salt, said plutonium salt containing plutonium in a valence state of at least +3, contacting said aqueous solution with a substantially water-immiscible organic solvent, and separating the resultant aqueous phase and organic solvent extract phase containing at least part of said plutonium as a chelate compound.

4. A process for the separation of plutonium from a mixture of plutonium and lanthanum, in which the lanthanum-to-plutonium molal ratio is at least 5, which comprises containing an aqueous solution having a pH between about 3 and 0.2 and containing in said molal ratio a lanthanum mineral acid salt and a plutonium mineral acid salt, said plutonium salt containing plutonium in a valence state of at least +3, with an organic solvent solution of a N-nitrosoarylhydroxylamine, said organic solvent being substantially water-immiscible, and separating the resultant aqueous phase and organic solvent extract phase containing at least part of said plutonium as a chelate compound.

5. The process of claim 2 in which the ammonium salt of N-nitrosoarylhydroxylamine is the ammonium salt of N-nitrosophenylhydroxylamine.

6. The process of claim 2 in which the ammonium salt of N-nitrosoarylhydroxylamine is the ammonium salt of N-nitroso-$\alpha$-naphthylhydroxylamine.

7. The process of claim 3 in which the organic solvent is chloroform.

8. The process of claim 3 in which the organic solvent is ethyl ether.

9. The process of claim 3 in which the organic solvent is benzene.

10. The process of claim 3 in which the lanthanum-to-plutonium molal ratio is at least 1000.

11. The process of claim 3 in which the lanthanum salt and plutonium salt in the aqueous solution are lanthanum phosphate and a plutonium phosphate and the pH is between 0.5 and 0.2.

12. The process of claim 3 in which the lanthanum salt and plutonium salt in the aqueous solution are lanthanum nitrate and a plutonium nitrate.

13. A process for the separation of plutonium from a mixture of plutonium and lanthanum in which the lanthanum-to-plutonium molal ratio is at least 5, which comprises adding an ammonium salt of a N-nitrosoarylhydroxylamine to an aqueous solution having a pH between about 3 and 0.2, and containing in said molal ratio a lanthanum mineral acid salt and a tetravalent plutonium mineral acid salt, contacting said aqueous solution with a substantially water-immiscible organic solvent, and separating the resultant aqueous phase and organic solvent extract phase containing at least part of said plutonium as a chelate compound.

14. A process for the separation of plutonium from a mixture of plutonium and lanthanum in which the lanthanum-to-plutonium molal ratio is at least 5, which comprises adding an ammonium salt of a N-nitrosoarylhydroxylamine to an aqueous solution having a pH between about 3 and 0.2 and containing in said molal ratio a lanthanum mineral acid salt and a plutonium mineral acid salt containing a $PuO_2^{+2}$ cation, contacting said aqueous solution with a substantially water-immiscible organic solvent, and separating the resultant aqueous phase and organic solvent extract phase containing at least part of said plutonium as a chelate compound.

15. The process of claim 13 in which the plutonium salt is triplutonium tetraphosphate and the pH is between 0.5 and 0.2.

16. The process of claim 13 in which the plutonium salt is plutonium tetranitrate.

17. The process of claim 14 in which the plutonium salt is plutonium dioxydinitrate.

18. A process of separating plutonium from a mixture of plutonium and lanthanum in which the lanthanum-to-plutonium molal ration is as least 5, comprising adding a compound selected from the group consisting of ammonium salt of N-nitrosoarylhydroxylamines and N-nitrosoarylhydroxylamines and a substantially water-immiscible organic solvent for said compound to an aqueous solution having a pH value between about 3 and 0.2 and containing in said molal ratio a lanthanum mineral acid salt and a plutonium mineral acid salt, and separating a resultant aqueous phase from an organic solvent extract phase containing plutonium in the form of a chelate with said compound.

19. The process of claim 18 wherein the compound is the ammonium salt of N-nitrosophenylhydroxylamine, the solvent is chloroform, and the plutonium salt is the plutonium tetranitrate.

20. The process of claim 19 wherein the pH value of said aqueous solution is between 1 and 0.2.

21. The process of claim 18 wherein the plutonium salt is back-extracted from the organic solvent extract phase by contacting the latter with an aqueous solution of a strong inorganic acid having a pH value of below 0.1.

No references cited.